US009588958B2

(12) United States Patent
Danielyan et al.

(10) Patent No.: US 9,588,958 B2
(45) Date of Patent: Mar. 7, 2017

(54) CROSS-LANGUAGE TEXT CLASSIFICATION

(75) Inventors: Tatiana Danielyan, Moscow (RU);
Konstantin Zuev, Moscow (RU);
Konstantin Anisimovich, Moscow
(RU); Vladimir Selegey, Moscow (RU)

(73) Assignee: ABBYY InfoPoisk LLC (RU)

( * ) Notice: Subject to any disclaimer, the term of this patent is extended or adjusted under 35 U.S.C. 154(b) by 237 days.

(21) Appl. No.: 13/535,638

(22) Filed: Jun. 28, 2012

(65) Prior Publication Data

US 2012/0271627 A1    Oct. 25, 2012

Related U.S. Application Data

(63) Continuation-in-part of application No. 12/983,220, filed on Dec. 31, 2010, which is a continuation-in-part of application No. 11/548,214, filed on Oct. 10, 2006, now Pat. No. 8,087,450.

(51) Int. Cl.
*G06F 17/27* (2006.01)
*G06F 17/28* (2006.01)

(52) U.S. Cl.
CPC .......... *G06F 17/277* (2013.01); *G06F 17/271* (2013.01); *G06F 17/2755* (2013.01); *G06F 17/2785* (2013.01); *G06F 17/2872* (2013.01); *G06F 17/27* (2013.01); *G06F 17/2705* (2013.01)

(58) Field of Classification Search
CPC .. G06F 17/2785; G06F 17/277; G06F 17/271; G06F 17/27; G06F 17/2705; G06F 17/2755
USPC ............................................................ 704/9
See application file for complete search history.

(56) References Cited

U.S. PATENT DOCUMENTS

| 4,914,590 A * | 4/1990 | Loatman et al. ............... 704/8 |
| 5,268,839 A | 12/1993 | Kaji |
| 5,301,109 A | 4/1994 | Landauer et al. |
| 5,386,556 A | 1/1995 | Hedin et al. |
| 5,418,717 A | 5/1995 | Su et al. |
| 5,426,583 A | 6/1995 | Uribe-Echebarria Diaz De Mendibil |
| 5,677,835 A | 10/1997 | Carbonell et al. |

(Continued)

FOREIGN PATENT DOCUMENTS

| EP | 2400400 A1 | 12/2001 |
| WO | 2011160204 A1 | 12/2011 |

OTHER PUBLICATIONS

Bolshakov, I.A. "Co-Ordinative Ellipsis in Russian Texts: Problems of Description and Restoration" Proceedings of the 12th conference on Computational linguistics, vol. 1, pp. 65-67. Association for Computational Linguistics 1988.

(Continued)

*Primary Examiner* — Samuel G Neway
(74) *Attorney, Agent, or Firm* — Veronica Weinstein

(57) ABSTRACT

Methods are described for performing classification (categorization) of text documents written in various languages. Language-independent semantic structures are constructed before classifying documents. These structures reflect lexical, morphological, syntactic, and semantic properties of documents. The methods suggested are able to perform cross-language text classification which is based on document properties reflecting their meaning. The methods are applicable to genre classification, topic detection, news analysis, authorship analysis, etc.

21 Claims, 14 Drawing Sheets

(56) References Cited

U.S. PATENT DOCUMENTS

| | | | |
|---|---|---|---|
| 5,678,051 A | 10/1997 | Aoyama | |
| 5,687,383 A | 11/1997 | Nakayama et al. | |
| 5,715,468 A | 2/1998 | Budzinski | |
| 5,752,051 A | 5/1998 | Cohen | |
| 5,768,603 A | 6/1998 | Brown et al. | |
| 5,787,410 A | 7/1998 | McMahon | |
| 5,794,050 A | 8/1998 | Dahlgren et al. | |
| 5,826,219 A | 10/1998 | Kutsumi | |
| 5,884,247 A | 3/1999 | Christy | |
| 5,930,746 A * | 7/1999 | Ting | 704/9 |
| 6,006,221 A * | 12/1999 | Liddy et al. | |
| 6,055,528 A | 4/2000 | Evans | |
| 6,076,051 A | 6/2000 | Messerly et al. | |
| 6,081,774 A * | 6/2000 | de Hita et al. | 704/9 |
| 6,182,028 B1 | 1/2001 | Karaali et al. | |
| 6,233,544 B1 | 5/2001 | Alshawi | |
| 6,243,670 B1 | 6/2001 | Bessho et al. | |
| 6,246,977 B1 | 6/2001 | Messerly et al. | |
| 6,275,789 B1 | 8/2001 | Moser et al. | |
| 6,295,543 B1 * | 9/2001 | Block et al. | 715/234 |
| 6,356,864 B1 | 3/2002 | Foltz et al. | |
| 6,381,598 B1 | 4/2002 | Williamowski et al. | |
| 6,442,524 B1 | 8/2002 | Ecker et al. | |
| 6,463,404 B1 * | 10/2002 | Appleby | 704/9 |
| 6,601,026 B2 | 7/2003 | Appelt et al. | |
| 6,604,101 B1 | 8/2003 | Chan et al. | |
| 6,622,123 B1 | 9/2003 | Chanod et al. | |
| 6,631,346 B1 * | 10/2003 | Karaorman et al. | 704/9 |
| 6,778,949 B2 | 8/2004 | Duan et al. | |
| 6,871,199 B1 | 3/2005 | Binnig et al. | |
| 6,901,402 B1 | 5/2005 | Corston-Oliver et al. | |
| 6,928,448 B1 | 8/2005 | Franz et al. | |
| 6,937,974 B1 | 8/2005 | d'Agostini | |
| 6,947,923 B2 | 9/2005 | Cha et al. | |
| 6,965,857 B1 | 11/2005 | Decary | |
| 6,983,240 B2 | 1/2006 | Ait-Mokhtar et al. | |
| 7,027,974 B1 * | 4/2006 | Busch et al. | 704/4 |
| 7,146,358 B1 | 12/2006 | Gravano et al. | |
| 7,200,550 B2 | 4/2007 | Menezes et al. | |
| 7,263,488 B2 | 8/2007 | Chu et al. | |
| 7,475,015 B2 | 1/2009 | Epstein et al. | |
| 7,672,831 B2 | 3/2010 | Todhunter et al. | |
| 7,739,102 B2 | 6/2010 | Bender | |
| 8,078,450 B2 * | 12/2011 | Anisimovich et al. | 704/9 |
| 8,145,473 B2 | 3/2012 | Anisimovich et al. | |
| 8,214,199 B2 | 7/2012 | Anisimovich et al. | |
| 8,229,730 B2 | 7/2012 | Van Den Berg et al. | |
| 8,229,944 B2 | 7/2012 | Latzina et al. | |
| 8,271,453 B1 | 9/2012 | Pasca et al. | |
| 8,285,728 B1 | 10/2012 | Rubin | |
| 8,301,633 B2 | 10/2012 | Cheslow | |
| 8,402,036 B2 | 3/2013 | Blair-Goldensohn et al. | |
| 8,577,907 B1 | 11/2013 | Singhal et al. | |
| 2001/0056352 A1 * | 12/2001 | Xun | 704/277 |
| 2002/0022956 A1 * | 2/2002 | Ukrainczyk et al. | 704/9 |
| 2003/0040901 A1 * | 2/2003 | Wang | 704/4 |
| 2003/0176999 A1 | 9/2003 | Calcagno et al. | |
| 2005/0155017 A1 | 7/2005 | Berstis et al. | |
| 2005/0192792 A1 * | 9/2005 | Carus | G06F 17/2735 704/2 |
| 2005/0209844 A1 | 9/2005 | Wu et al. | |
| 2005/0240392 A1 | 10/2005 | Munro, Jr. et al. | |
| 2005/0267871 A1 | 12/2005 | Marchisio et al. | |
| 2006/0004563 A1 * | 1/2006 | Campbell et al. | 704/9 |
| 2007/0083505 A1 | 4/2007 | Ferrari et al. | |
| 2007/0156669 A1 | 7/2007 | Marchisio et al. | |
| 2007/0244690 A1 * | 10/2007 | Peters | 704/8 |
| 2008/0091405 A1 * | 4/2008 | Anisimovich et al. | 704/4 |
| 2008/0319947 A1 | 12/2008 | Latzina et al. | |
| 2009/0063472 A1 | 3/2009 | Pell et al. | |
| 2009/0182738 A1 | 7/2009 | Marchisio et al. | |
| 2009/0271179 A1 | 10/2009 | Marchisio et al. | |
| 2011/0055188 A1 | 3/2011 | Gras | |
| 2011/0072021 A1 | 3/2011 | Lu et al. | |
| 2011/0301941 A1 | 12/2011 | De Vocht | |
| 2012/0023104 A1 | 1/2012 | Johnson et al. | |
| 2012/0030226 A1 | 2/2012 | Holt et al. | |
| 2012/0131060 A1 | 5/2012 | Heidasch | |
| 2012/0197885 A1 | 8/2012 | Patterson | |
| 2012/0203777 A1 | 8/2012 | Laroco, Jr. et al. | |
| 2012/0221553 A1 | 8/2012 | Wittmer et al. | |
| 2012/0246153 A1 | 9/2012 | Pehle | |
| 2012/0271627 A1 * | 10/2012 | Danielyan et al. | 704/9 |
| 2012/0296897 A1 | 11/2012 | Xin-Jing et al. | |
| 2013/0013291 A1 | 1/2013 | Bullock et al. | |
| 2013/0041652 A1 * | 2/2013 | Zuev et al. | 704/8 |
| 2013/0054589 A1 | 2/2013 | Cheslow | |
| 2013/0091113 A1 | 4/2013 | Gras | |
| 2013/0254209 A1 | 9/2013 | Kang | |

OTHER PUBLICATIONS

Hutchins, Machine Translation: Past, Present, Future, Ellis Horwood, Ltd., Chichester, UK, 1986.

Mitamura, T. et al. "An Efficient Interlingua Translation System for Multi-lingual Document Production," Proceedings of Machine Translation Summit III, Washington DC, Jul. 2-4, 1991.

* cited by examiner

CROSS-LANGUAGE TEXT CLASSIFICATION

CROSS-REFERENCE TO RELATED APPLICATIONS

For purposes of the USPTO extra-statutory requirements, the present application constitutes a continuation-in-part of U.S. patent application Ser. No. 12/983,220, filed on 31 Dec. 2010, which is a continuation-in-part of U.S. Ser. No. 11/548,214, filed on 10 Oct. 2006, which is currently co-pending, or is an application of which a currently co-pending application is entitled to the benefit of the filing date.

The United States Patent Office (USPTO) has published a notice effectively stating that the USPTO's computer programs require that patent applicants reference both a serial number and indicate whether an application is a continuation or continuation-in-part. See Stephen G. Kunin, Benefit of Prior-Filed Application, USPTO Official Gazette 18 Mar. 2003. The Applicant has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but points out that the designations are not to be construed as commentary or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

All subject matter of the Related Application(s) and of any and all parent, grandparent, great-grandparent, etc. applications of the Related Applications is incorporated herein by reference to the extent such subject matter is not inconsistent herewith.

BACKGROUND OF THE INVENTION

Field

Implementations of the present invention relate to natural language processing. In particular, implementations of the present invention relate to classifying text documents written in one or many languages.

Related Art

Many natural language processing systems involve classifying texts into predefined categories. For example, in order to sort the huge amount of news available online into some meaningful categories, e.g., politics, cultural events, sport etc., a text classification method may be applied.

Nowadays, there is a great desire to be able to analyze multi-language data. However, existing text processing systems are usually language-dependent, i.e., they are able to analyze text written only in one particular language.

The very few existing cross-language systems are based on machine translation techniques, they choose a so called target language, translate all documents to that language with machine translation techniques, and then construct document representation and apply classification. The machine translation creates additional errors and, moreover, the analysis is usually based on low-level properties of documents, and the meanings of documents are not reflected in the utilized representation.

Thus, there is a need it is possible to create systems that can improve cross-language document classification, systems that would take into account not only the symbolic information but the semantics, i.e., meaning, of documents.

BRIEF DESCRIPTION OF THE DRAWINGS

So that the manner in which the recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
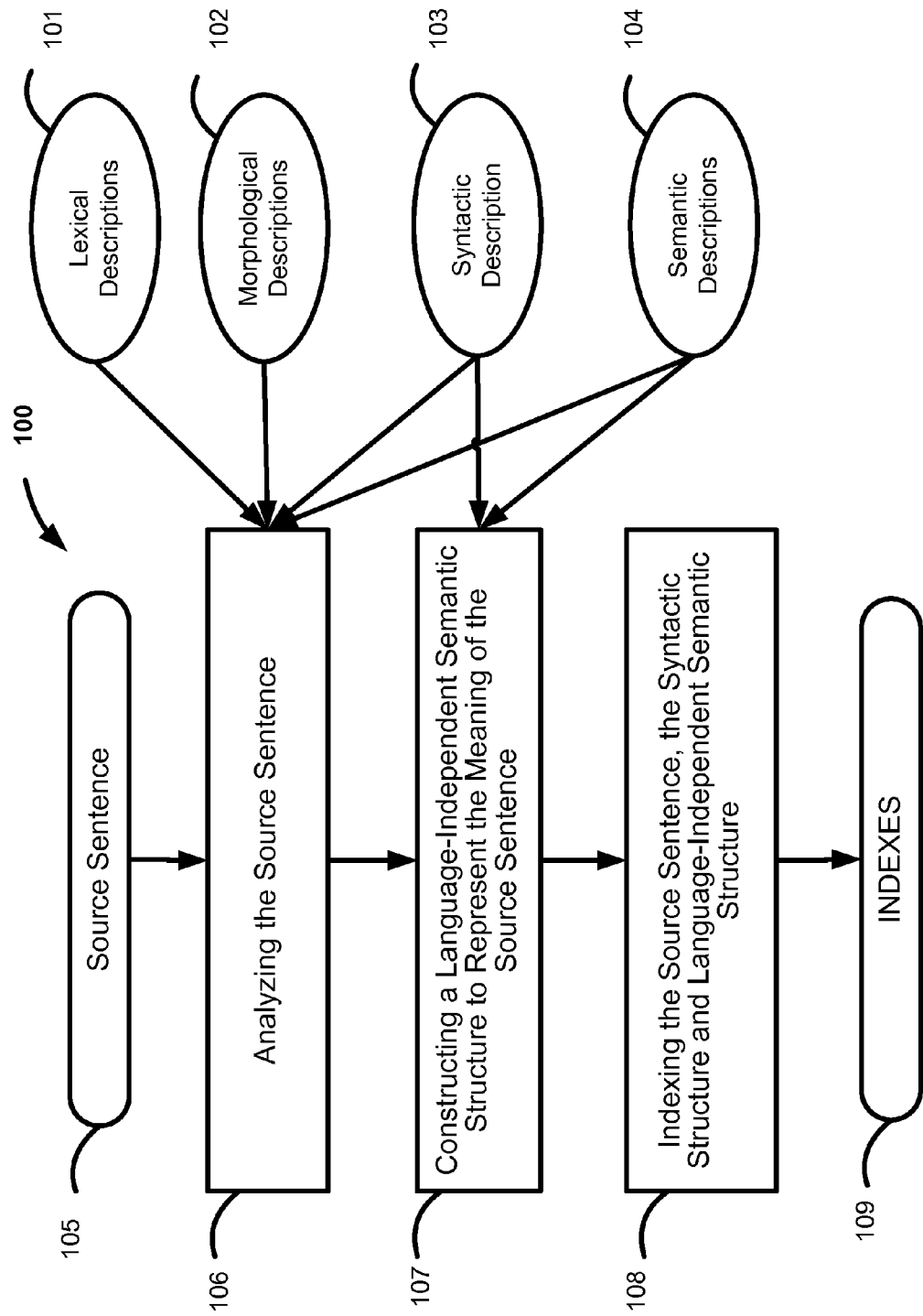
FIG. 1 is a flow diagram of a method according to one or more embodiments of the invention.

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an implementation" means that a particular feature, structure, or characteristic described in connection with the embodiment is included in at least one implementation of the invention. The appearances of the phrase "in one embodiment" or "in one implementation" in various places in the specification are not necessarily all referring to the same embodiment or implementation, nor are separate or alternative embodiments mutually exclusive of other embodiments. Moreover, various features are described which may be exhibited by some embodiments and not by others. Similarly, various requirements are described which may be requirements for some embodiments but not other embodiments.

Implementations of the present invention disclose techniques for cross-language natural language text processing such as text classification based on exhaustive syntactic and semantic analyses of texts and language-independent semantic structures. A lot of lexical, grammatical, syntactical, pragmatic, semantic and other features of the texts may be identified, extracted and effectively used to solve said task.

A classifier is an instrument to perform classification. One implementation of document classification may be formulated as follows: given a finite set of categories $\{C_1, C_2, \ldots, C_n\}$ and an input document D, a classifier has to assign the document D to one (or more) of the categories $\{C_1, C_2, \ldots, C_n\}$ or produce an output representing a set of pairs (a so called classification spectrum) $\{(C_1, w_1), (C_2, w_2), \ldots, (C_n, w_n)\}$, where for each integer i from 1 to n, $C_i$ is the category and $w_i$ is a weight (e.g., a real number in the interval [0,1]) defining to which extend the document D belongs to the category $C_i$. A threshold value may be defined in order to omit the categories with low weights below the threshold. For example, given the following categories {Sport, TV, Business, Art} and a document to be classified describing a TV show about football, an adequate classifier could produce the following classification spectrum for the document {(Sport, 0.7), (TV, 0.8), (Business, 0.2), (Art, 0.05)}. If the threshold is 0.3, only sport and TV categories will be considered.

Classification is a task of supervised learning, i.e., supervised (training) data is required. Training data is a set of labeled documents, i.e., each document is labeled with its category or classification spectrum. By analyzing this labeled data, a so called classification function or classification model is defined. This function or model should predict an output (category or a classification spectrum) for an input document.

Many natural language processing (NLP) problems may be formulated as a task of classification. For example, authorship attribution is a problem of assigning authors to anonymous texts, the authors are to be chosen out of a predefined list of possible authors. For each possible author, one or more documents written by the author are available. Thus, these documents are the training data and a classifier may be trained in order to assign an author to the anonymous texts. Another problem formulated as a task of classification is determining a document's genre or topic(s) out of lists of possible genres and topics when training data are available for each genre or topic.

Classification is usually performed on documents represented as vectors of so called features. Features represent characteristics of the documents to be classified and should reflect essential characteristics for the particular task. The naïve approach is to create features out of words: each word in a document may be a feature, thus vectors containing frequencies of each word may be utilized in classification. Another common way to create this vector space model is term frequency—inverted document frequency (TF-IDF) document representation (such as described by Salton, 1988), in this approach a value in a document vector is not only proportional to the corresponding word frequency in the document but is also inversely proportional to its frequency in the entire document corpus. Thus, those words that are frequently found in documents (e.g., and, but, the, a, etc.) do not get high values.

Of course, some tasks require more sophisticated features for representing and processing documents since document features should reflect those characteristics that are helpful for tasks.

For example, the topic of a document could hardly be reflected by a feature such as average sentence length. Though sentence length could be used or useful in an authorship analysis because some authors are known for using very long sentences (e.g., L. Tolstoy) while others prefer shorter ones (e.g., E. Hemingway).

Some widely used features that can be used are primarily lexical and character features, those that consider a text as a sequence of words and characters respectively. Namely, word frequencies, n-grams, letter frequencies, character n-grams, etc. A big advantage of these features is that they are easy to be extracted automatically. But they are language dependent and do not capture a document's semantics. Therefore, these lexical-based features do not allow performing cross-language, semantically rich, document analysis.

Language independent features capturing not only the symbolic information but semantics of a text often appear to be more promising for solving various tasks. For example, certain tasks associated within authorship analysis systems are promising since many authors write in different languages or their texts are translated. A language independent system could fairly compare authors across different languages. Features of the original author can be lost in translation. Language independent systems should capture an author's writing style when an author's work is translated. Language independent systems would also be highly useful to group online news by topic across languages, since there is a big amount of news in different languages over the Internet.

Previous cross-language systems do not provide accurate extraction of language independent semantically rich features of text. Therefore these systems were very rarely exploited or adopted by a large user base. Existing systems for text document processing typically are limited to analyzing documents written in a single language. However, for some tasks such as topic detection in online news or authorship attribution of translated texts, cross-language analysis techniques are required. The existing systems dealing with documents written in different languages usually translate them to one particular language (e.g., English) with machine translating systems and then apply classification. Therefore syntactic and semantic properties of the source sentences are not taken into account.

Advantageously, the problems associated with existing text processing systems are overcome or at least reduced by the techniques and systems disclosed herein.

Implementations of the invention allow a user to perform classification of natural language texts written in one or many natural languages. The disclosed classification method may take into account lexical, grammatical, syntactical, pragmatic, semantic and other features of the texts.

These features are extracted for constructing language-independent semantic structures. The system employs automatic syntactic and semantic analyses when processing texts. It indexes and stores syntactic and semantic information about each sentence, as well as parses results and lexical choices including results obtained when resolving ambiguities. The system analyzes sentences using linguistic descriptions of a given natural language to reflect the real complexities of the natural language, rather than simplified or artificial descriptions. A principle of integral and purpose-driven recognition, where hypotheses about the structure of a part of a sentence are verified within the hypotheses about the structure of the whole sentence, is implemented during the analysis stage. It avoids analyzing numerous parsing of anomalous variants.

FIG. 1 is a flow diagram 100 of a method according to one or more embodiments of the invention. With reference to FIG. 1, linguistic descriptions may include lexical descriptions 101, morphological descriptions 102, syntactic descriptions 103, and semantic descriptions 104. Each of these components of linguistic descriptions are shown influencing or serving as input to steps in the flow diagram 100. The method includes starting from a source sentence 105. The source sentence is analyzed 106. Next, a language-independent semantic structure (LISS) is constructed 107. The LISS represents the meaning of the source sentence. Next, the source sentence, the syntactic structure of the source sentence and the LISS are indexed 108. The result is a set of collection of indexes or indices 109.

In one implementation, a plurality of linguistic models and knowledge about natural languages may be arranged in a database and applied for analyzing each text or source sentence such as at step 106. Such a plurality of linguistic models may include morphology models, syntax models, grammar models and lexical-semantic models (not shown in FIG. 1). In a particular implementation, integral models for describing the syntax and semantics of a language are used in order to recognize the meanings of the source sentence, analyze complex language structures, and correctly convey information encoded in the source sentence.

Figure 2:
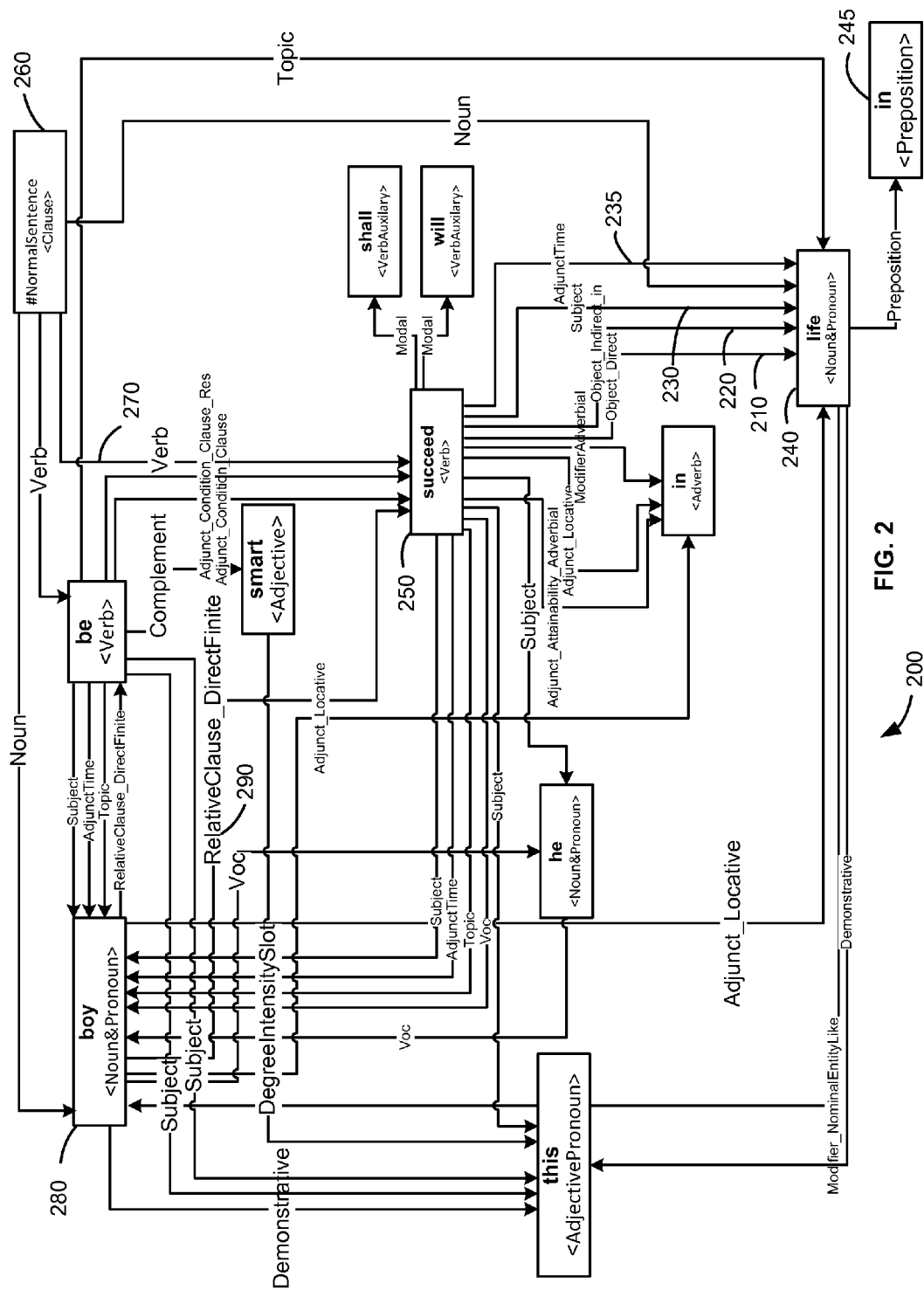
FIG. 2 is a diagram illustrating language descriptions of an exemplary sentence according to one exemplary embodiment of the invention.

FIG. 2 is a diagram illustrating language descriptions of an exemplary sentence ("This boy is smart, he'll succeed in life.") according to one exemplary embodiment of the invention.

Figure 5:
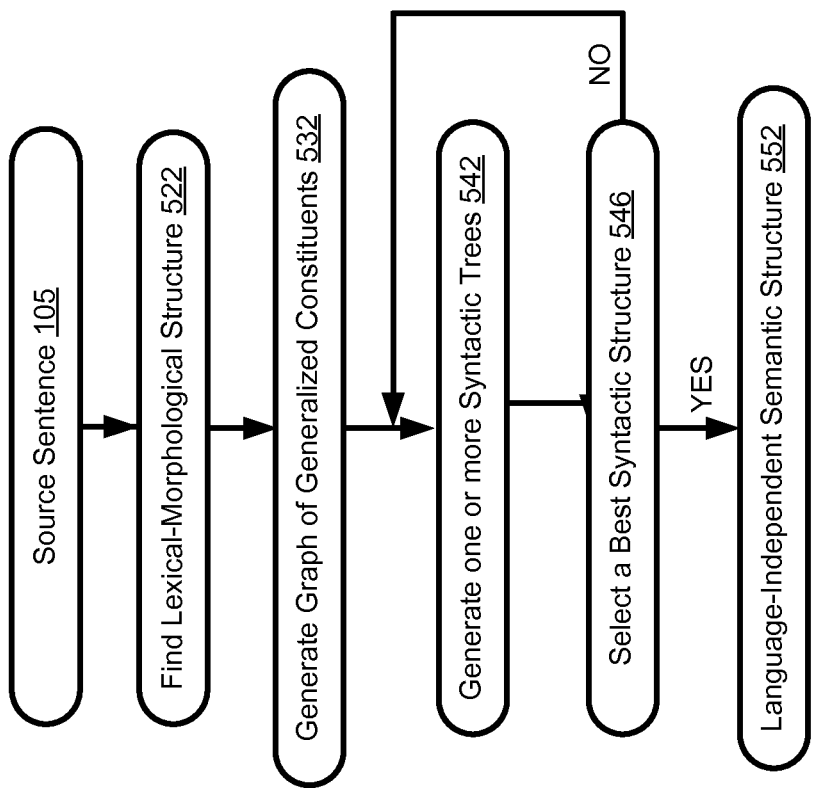
FIG. 5 is a flow diagram of another method according to one or more embodiments of the invention.

FIG. 5 shows a flow diagram of another method according to one or more embodiments of the invention. With reference to FIG. 1 and FIG. 5, when analyzing 106 the meaning of the source sentence 105, a lexical-morphological structure is found 522. Next, a syntactic analysis is performed and is realized in a two-step analysis algorithm (e.g., a "rough" syntactic analysis and a "precise" syntactic analysis) implemented to make use of linguistic models and knowledge at various levels, to calculate probability ratings and to generate the most probable syntactic structure, e.g., a best syntactic structure.

Accordingly, a rough syntactic analysis is performed on the source sentence to generate a graph of generalized constituents 532 for further syntactic analysis. All reasonably possible surface syntactic models for each element of lexical-morphological structure are applied, and all the possible constituents are built and generalized to represent all the possible variants of parsing the sentence syntactically.

Following the rough syntactic analysis, a precise syntactic analysis is performed on the graph of generalized constituents to generate one or more syntactic trees 542 to represent the source sentence. In one implementation, generating the syntactic tree 542 comprises choosing between lexical options and choosing between relations from the graphs. Many prior and statistical ratings may be used during the process of choosing between lexical options, and in choosing between relations from the graph. The prior and statistical ratings may also be used for assessment of parts of the generated tree and for the whole tree. In one implementation, the one or more syntactic trees may be generated or arranged in order of decreasing assessment. Thus, the best syntactic tree may be generated first. Non-tree links are also checked and generated for each syntactic tree at this time. If the first generated syntactic tree fails, for example, because of an impossibility to establish non-tree links, the second syntactic tree is taken as the best, etc.

Figure 3:
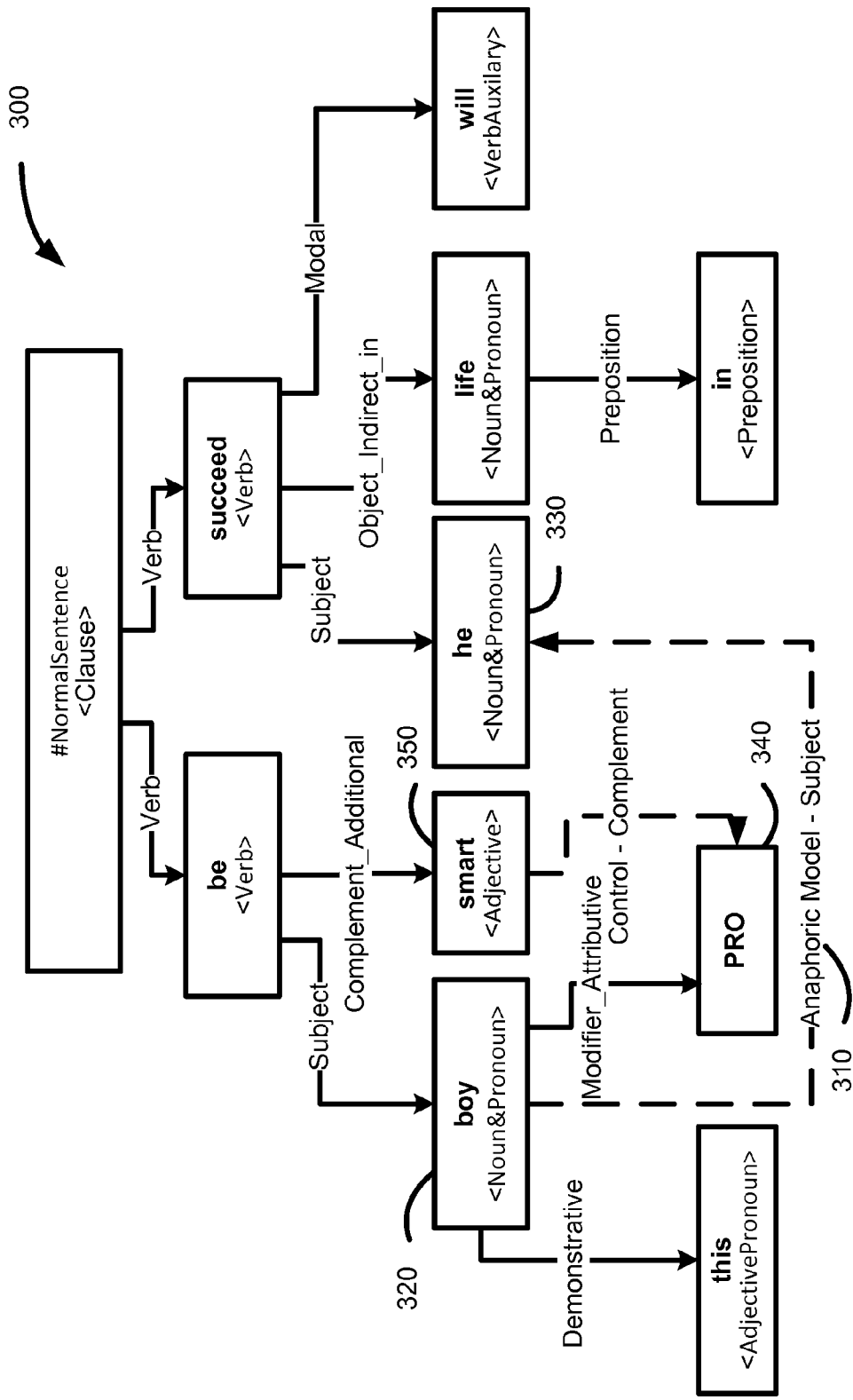
FIG. 3 is a diagram illustrating morphological descriptions according to one exemplary embodiment of the invention.

FIG. 3 shows an example of a syntactic tree 300, obtained as a result of a precise syntactic analysis of the sentence, "This boy is smart, he'll succeed in life." This tree contains complete or substantially complete syntactic information, such as lexical meanings, parts of speech, syntactic roles, grammatical values, syntactic relations (slots), syntactic models, non-tree link types, etc. For example, "he" is found to relate to "boy" as an anaphoric model subject 310. "Boy" is found as a subject 320 of the verb "be." "He" is found to be the subject 330 of "succeed." "Smart" is found to relate to "boy" through a "control—complement" 340. "Smart" is found to be an adjective 350.

With reference to FIG. 5, this two-step syntactic analysis approach ensures that the meaning of the source sentence is accurately represented by the best syntactic structure 546 chosen from the one or more syntactic trees. Advantageously, the two-step analysis approach follows a principle of integral and purpose-driven recognition, i.e., hypotheses about the structure of a part of a sentence are verified using all available linguistic descriptions within the hypotheses about the structure of the whole sentence. This approach avoids a need to analyze numerous parsing anomalies or variants known to be invalid. In some situations, this approach reduces the computational resources required to process the sentence.

With reference to FIG. 1, at step 120, after the sentence has been analyzed, the syntactic structure of the sentence is semantically interpreted, and a language-independent semantic structure is constructed to represent the meaning of the sentence. The language-independent semantic structure is a generalized data structure in a language-independent form or format. Such language-independent semantic structure is generated for each sentence to accurately describe the meaning of the sentence and to reflect all or substantially all grammatical, lexical and syntactic features in language-independent terms.

Figure 4:
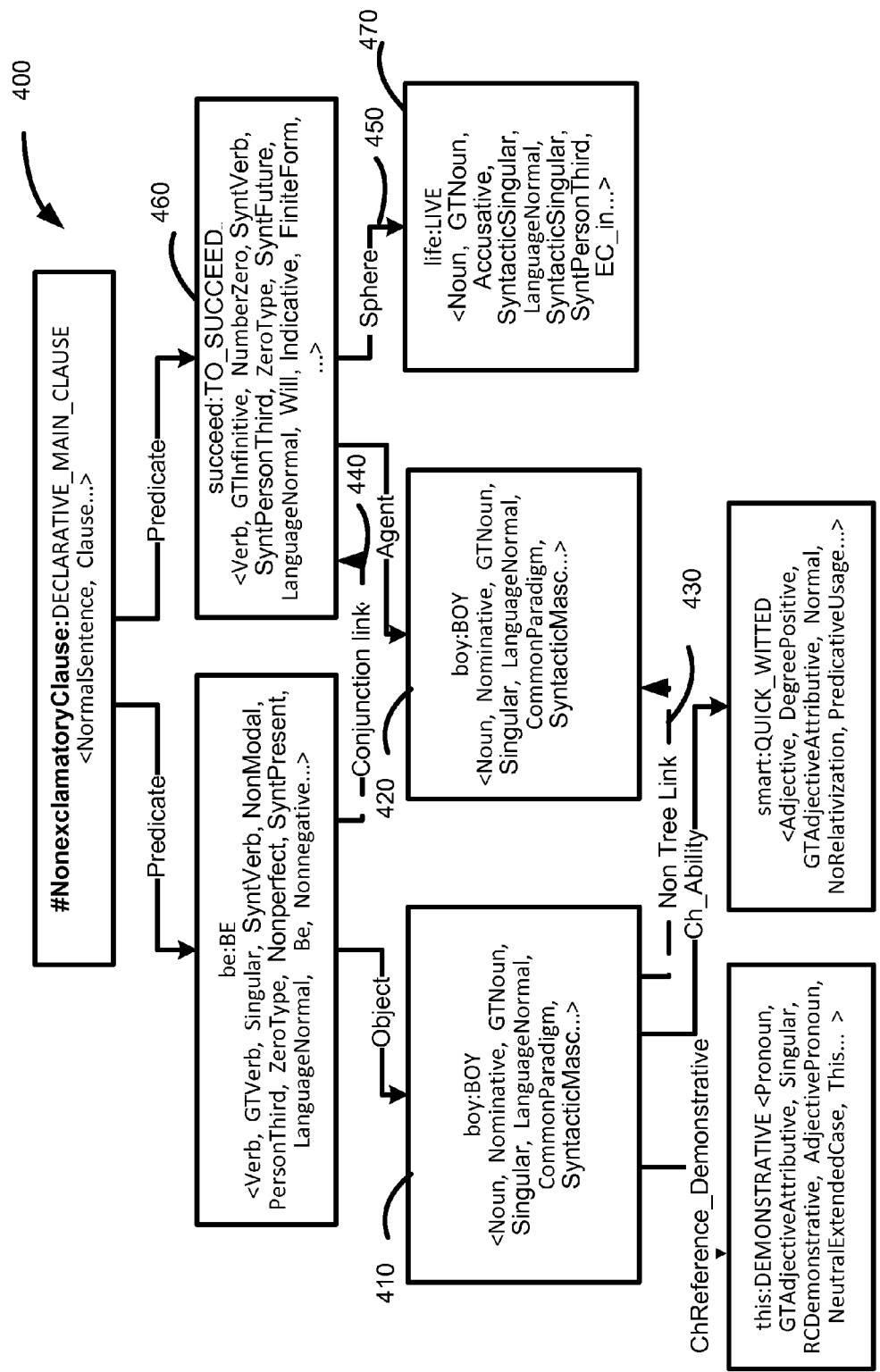
FIG. 4 is a diagram illustrating syntactic descriptions according to one exemplary embodiment of the invention.

The analysis methods ensure that the maximum accuracy in conveying or understanding the meaning of the sentence is achieved. FIG. 4 shows an example of a semantic structure, obtained for the sentence "This boy is smart, he'll succeed in life." With reference to FIG. 4, this structure contains all syntactic and semantic information, such as semantic class, semantemes, semantic relations (deep slots), non-tree links, etc.

With reference to FIG. 4, the conjunction non-tree link 440 connects two parts of the complex sentence "This boy is smart, he'll succeed in life." Also, referential non-tree link 430 connects two constituents 410 and 420. This non-tree link reflects anaphoric relation between the words "boy" and "he" to identify the subjects of the two parts of the complex sentence. This relation (310) is also shown on a syntactic tree (FIG. 3) after a syntactic analysis and establishing non-tree links. Additionally, a proform PRO 340 is inserted to establish a link between the controller ("boy") 320 and the controlled element ("smart") 350. As a result, the complement "smart" 350 fills the surface slot "Modifier_Attributive" 360 of the controller "boy" 320 by means of a link of type "Control-Complement" 370.

FIG. 5 illustrates a method to convert a source sentence 105 into a language independent semantic structure 552 through the use of various structures according to an exemplary implementation of the invention and the linguistic descriptions employed. With reference to FIG. 5, a lexical-morphological structure 522 is found or created from a sentence (each sentence in a corpora or multi-sentence text). A graph of generalized constituents is created 532. Next, one or more syntactic trees are created 542. A best or preferred syntactic structure is selected 546. If a best one is not found, the method iterates until a best syntactic structure is identified (or until the possibilities have been exhausted). Indices of syntactic features may be generated after this step of selecting a best syntactic structure 546. Once a best syntactic structure is identified and selected 546, a language-independent semantic structure is created 552. After this step of generating a language-independent semantic structure, indices of semantic features may be generated.

Figure 6:
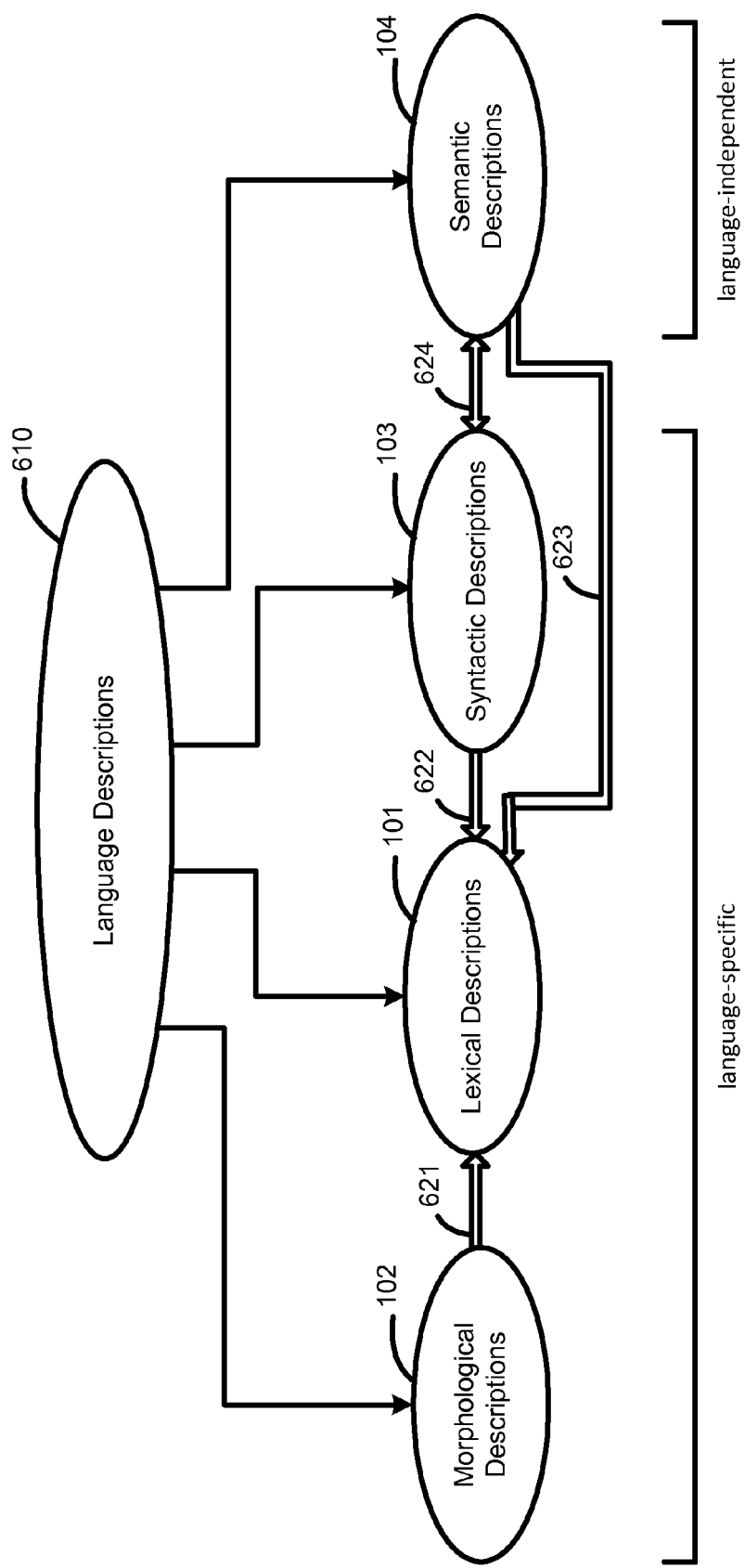
FIG. 6 is a diagram illustrating language descriptions according to one exemplary embodiment of the invention.

FIG. 6 is a diagram illustrating language descriptions 610 according to one exemplary implementation of the invention. With reference to FIG. 6, language descriptions 610 comprise morphological descriptions 102, syntactic descriptions 103, lexical descriptions 101 and semantic descriptions 104. Language descriptions 610 are joined into one common concept or construction. One of the core features of the language descriptions 610 is a semantic hierarchy, which links together language-independent semantic descriptions 604 and language-specific, lexical descriptions 603 as shown by the double arrow 623, morphological descriptions 102, and syntactic descriptions 103 as shown by the double arrow 624. A semantic hierarchy may be generated for each source or target language.

A semantic hierarchy may include semantic notions or semantic entities referred to herein as "semantic classes." The semantic classes may be arranged into a semantic hierarchy comprising hierarchical parent-child relationships. In general, a child semantic class inherits many or most properties of its direct parent and all ancestral semantic classes. For example, semantic class SUBSTANCE is a child of semantic class ENTITY and at the same time it is a parent of semantic classes GAS, LIQUID, METAL, WOOD_MATERIAL, etc.

Each semantic class in the semantic hierarchy is supplied with a deep model. The deep model of the semantic class is a set of deep slots. Deep slots reflect the semantic roles of child constituents in various sentences with objects of the semantic class as the core of a parent constituent and the possible semantic classes as fillers of deep slots. The deep slots express semantic relationships between constituents, including, for example, "agent," "addressee," "instrument," "quantity," etc. A child semantic class inherits and adjusts the deep model of its direct parent semantic class.

Semantic descriptions 104 are language-independent. Semantic descriptions 104 may provide descriptions of deep constituents, and may comprise a semantic hierarchy, deep slots descriptions, a system of semantemes, and pragmatic descriptions.

Figure 9:
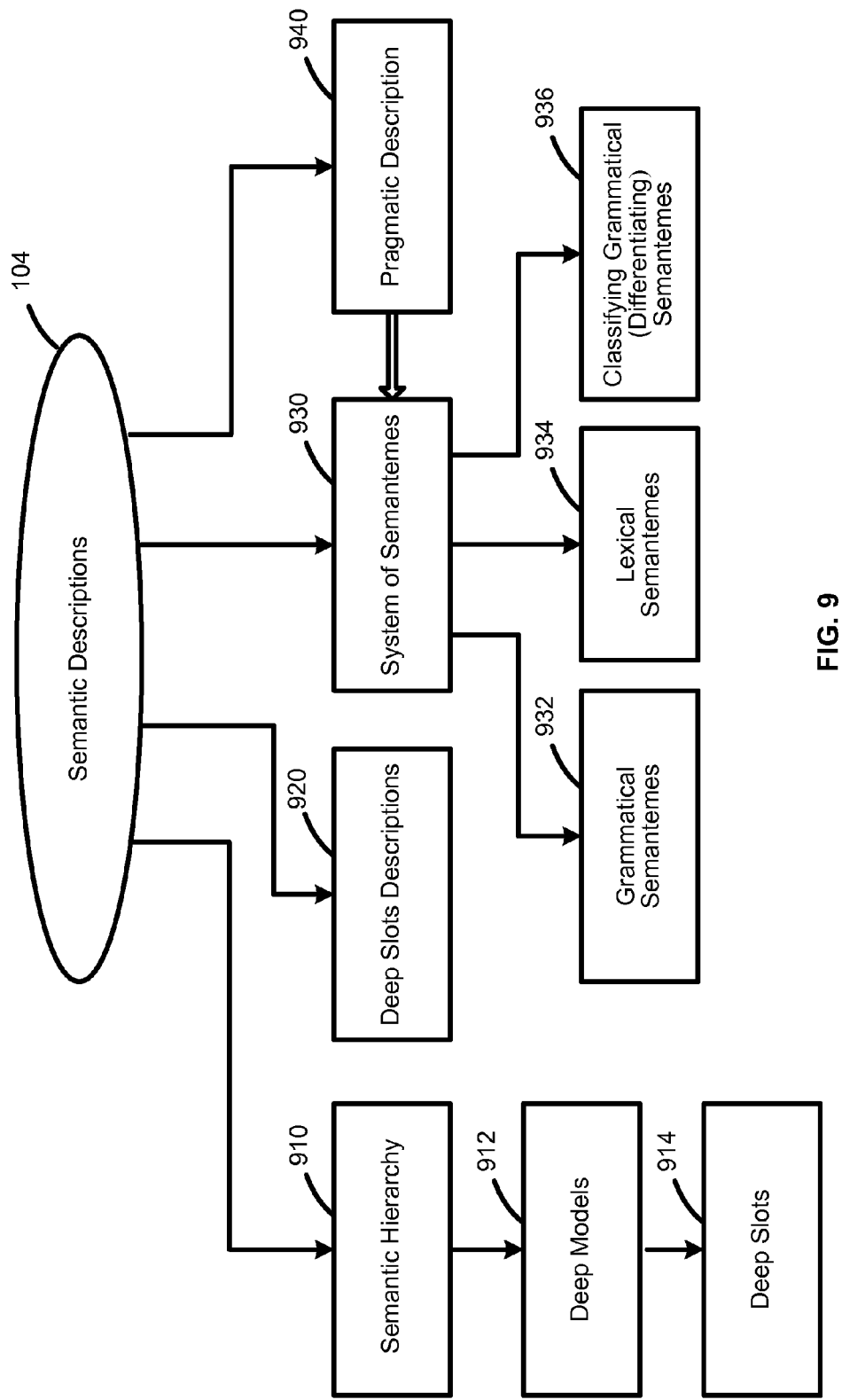
FIG. 9 is another diagram illustrating semantic descriptions according to another exemplary embodiment of the invention.

FIG. 9 is a diagram illustrating semantic descriptions according to an exemplary implementation of the technology. Deep slots 914 reflect the semantic roles of child constituents in the deep models 912. The deep slots descriptions 920 include grammatical and semantic restrictions on possible fillers of the deep slots 914. The properties and restrictions for the deep slots 914 and their possible fillers are often similar and oftentimes identical among different languages.

With reference to FIG. 9, a system of semantemes 930 represents a set of semantic categories. As an example, a semantic category "DegreeOfComparison" can be used to describe the degrees of comparison expressed by various forms of adjectives, for example, "easy," "easier" and "easiest." So, the semantic category "DegreeOfComparison" may include such semantemes as, for example, "Positive," "ComparativeHigherDegree," "SuperlativeHighestDegree," among others. As another example, a semantic category "RelationToReferencePoint" can be used to describe an order as before or after a reference point relative to some event or object, etc., and its semantemes may include, "Previous," "Subsequent," and the order may be spatial or temporal in a broad sense. As yet another example, "EvaluationObjective," as a semantic category, may describe an objective assessment, such as "Bad," "Good," etc. The system of semantemes typically must be programmed, generated or evaluated manually (by a person) for each language. This often involves many thousands of hours of work to create a system of semantemes 930 that is sufficiently robust or comprehensive.

With reference to FIG. 9, systems of semantemes 930 include language-independent semantic attributes that express semantic characteristics as well as stylistic, pragmatic and communicative characteristics. Semantemes can also be used to express an atomic meaning that finds a regular grammatical and/or lexical expression in a language. By purpose and usage, semantemes may be divided into various kinds, including, but not limited to, grammatical semantemes 932, lexical semantemes 934, and classifying grammatical (differentiating) semantemes 936.

With reference to FIG. 9, grammatical semantemes 932 are used to describe grammatical properties of constituents when transforming a syntactic tree (a language dependent object) into a semantic structure. Lexical semantemes 934 describe specific properties of objects (for example, "being flat" or "being liquid") and are used in the deep slot descriptions 920 as restriction for deep slot fillers (for example, for the verbs "face (with)" and "flood," respectively, in reference to "being flat" and "being liquid"). Classifying grammatical (differentiating) semantemes 936 express differentiating properties of objects within a single semantic class. For example, in the semantic class "HAIRDRESSER," the semanteme <<RelatedToMen>> is assigned to the lexical meaning "barber," unlike other lexical meanings which also belong to this class, such as "hairdresser," "hairstylist," etc.

With reference to FIG. 9, pragmatic descriptions 940 are used to assign a corresponding theme, style or genre to texts and objects of the semantic hierarchy 910. For example, "Economic Policy," "Foreign Policy," "Justice," "Legislation," "Trade," "Finance," etc.

With reference to FIG. 6, the morphological descriptions 102, the lexical descriptions 101, the syntactic descriptions 103, and the semantic descriptions 104 may be related. A lexical meaning may have one or more surface (syntactic) models that may be provided by semantemes and pragmatic characteristics. The syntactic descriptions 103 and the semantic descriptions 104 are also related. For example, diatheses of the syntactic descriptions 103 can be considered as an "interface" between the language-specific surface models and language-independent deep models of the semantic description 104.

Figure 7:
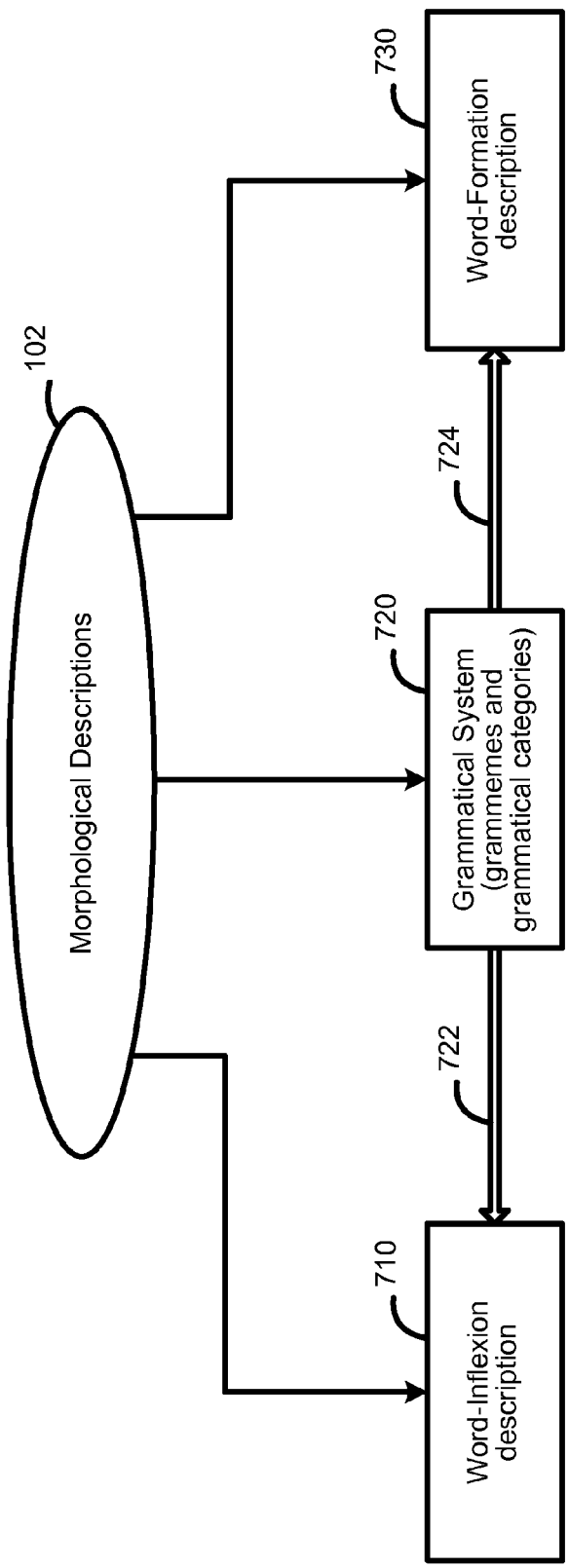
FIG. 7 is a diagram illustrating morphological descriptions according to one or more embodiments of the invention.

FIG. 7 illustrates exemplary morphological descriptions 102. As shown, the components of the morphological descriptions 102 include, but are not limited to, word-inflexion description 710, grammatical system (e.g., grammemes) 720, and word-formation description 730. In one embodiment, grammatical system 720 includes a set of grammatical categories, such as, "Part of speech," "Case," "Gender," "Number," "Person," "Reflexivity," "Tense,"

"Aspect," etc. and their meanings, hereafter referred to as "grammemes." For example, part of speech grammemes may include "Adjective," "Noun," "Verb," etc.; case grammemes may include "Nominative," "Accusative," "Genitive," etc.; and gender grammemes may include "Feminine," "Masculine," "Neuter," etc.

With reference to FIG. 7, a word-inflexion description 710 describes how the main form of a word may change according to its case, gender, number, tense, etc. and broadly includes all possible forms for a given word. Word-formation 730 describes which new words may be generated involving a given word. The grammemes are units of the grammatical systems 720 and, as shown by a link 722 and a link 724, the grammemes can be used to build the word-inflexion description 710 and the word-formation description 730.

Figure 8:
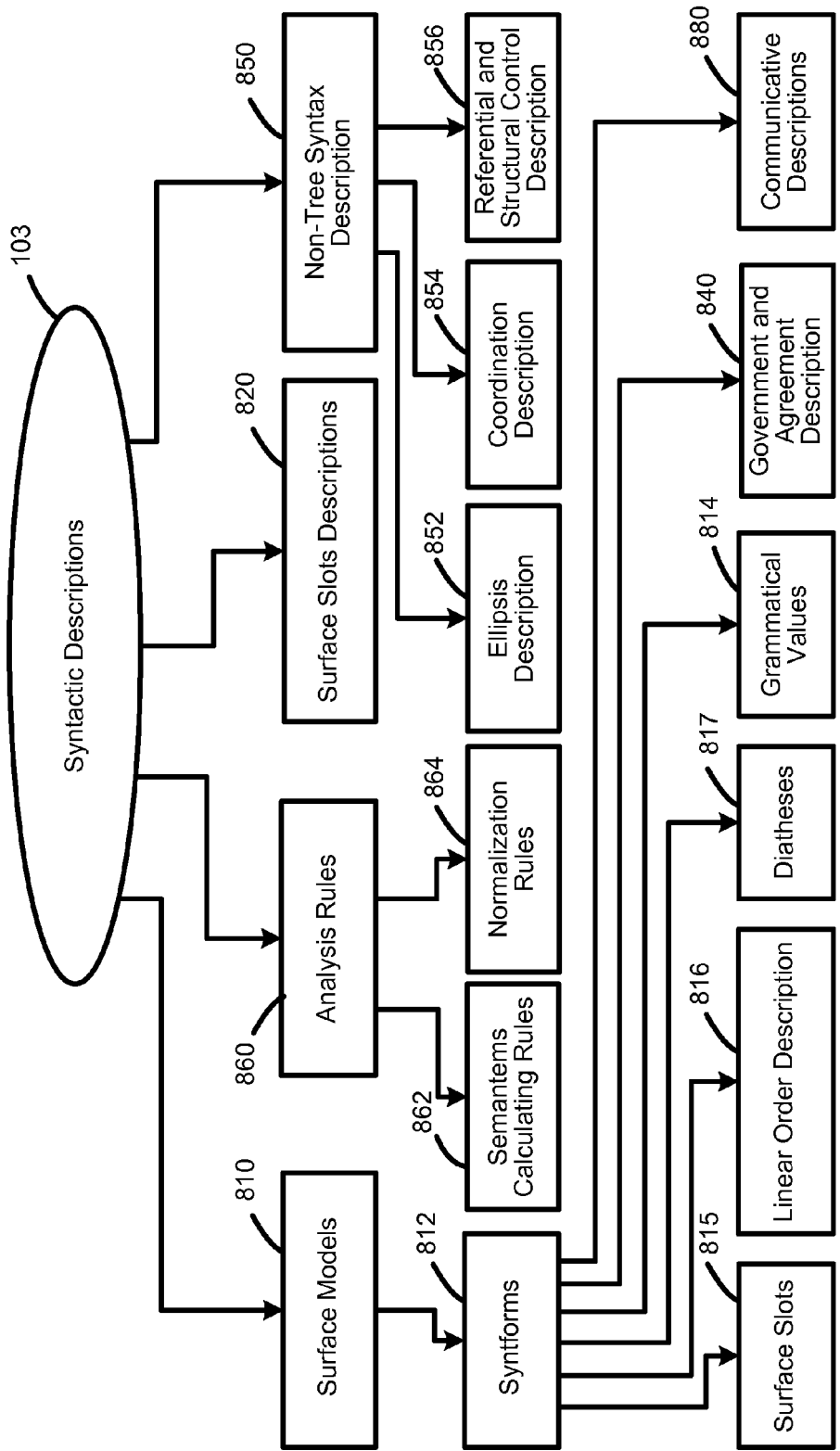
FIG. 8 is diagram illustrating syntactic descriptions according to one or more embodiments of the invention.

FIG. 8 illustrates exemplary syntactic descriptions 103. With reference to FIG. 8, the components of the syntactic descriptions 103 may comprise surface models 810, surface slot descriptions 820, referential and structural control descriptions 856, government and agreement descriptions 840, non-tree syntax descriptions 850, and analysis rules 860. The syntactic descriptions 302 are used to construct possible syntactic structures of a sentence from a given source language, taking into account free linear word order, non-tree syntactic phenomena (e.g., coordination, ellipsis, etc.), referential relationships, and other considerations.

Figure 10:
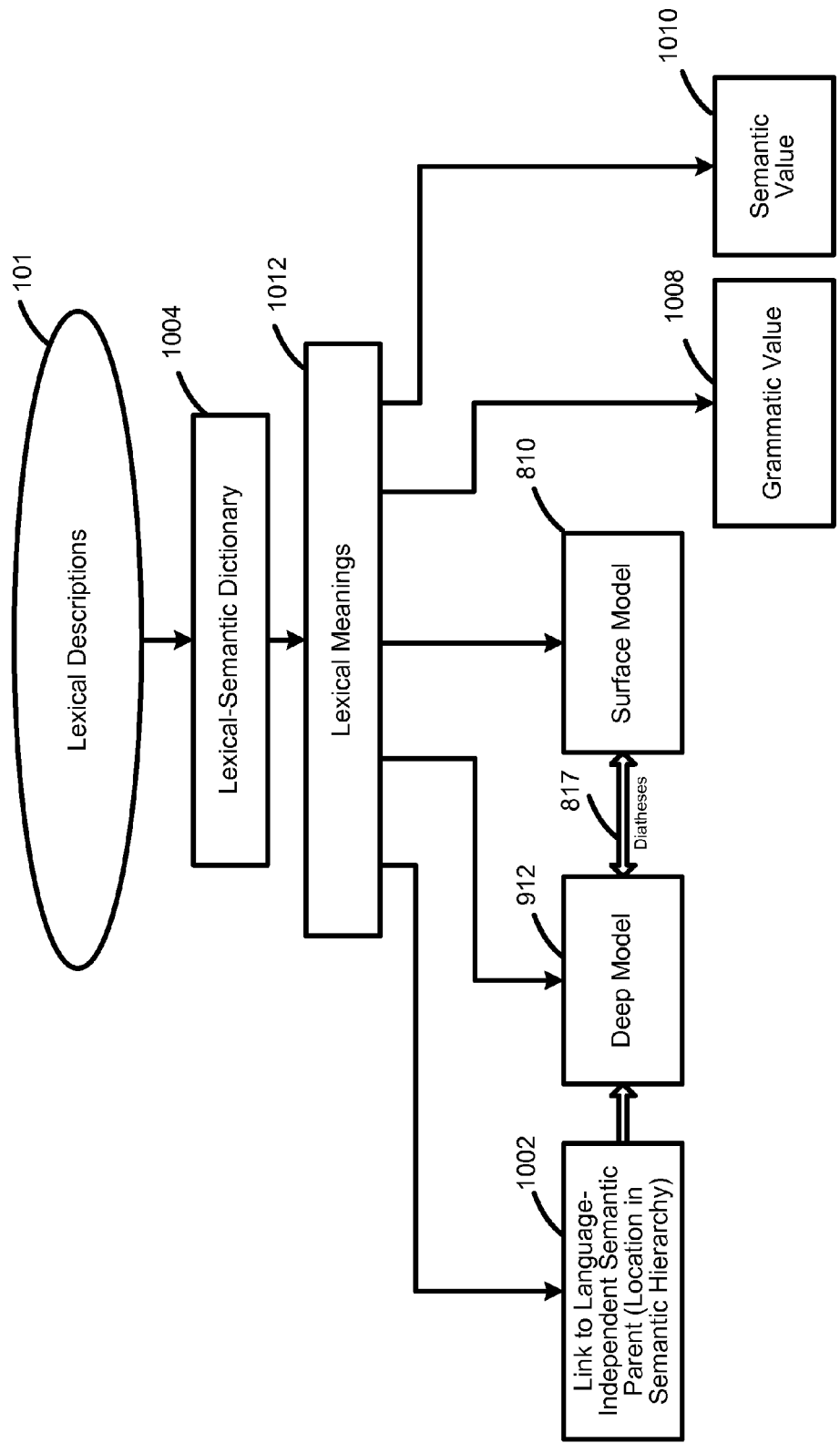
FIG. 10 is a diagram illustrating lexical descriptions according to one or more embodiments of the invention.

FIG. 10 is a diagram illustrating lexical descriptions 101 according to one exemplary implementation of the technology. The lexical descriptions 101 include a lexical-semantic dictionary 1004 that includes a set of lexical meanings 1012 arranged with their semantic classes into a semantic hierarchy, where each lexical meaning may include, but is not limited to, its deep model 912, surface model 810, grammatical value 1008 and semantic value 1010.

Figure 11:
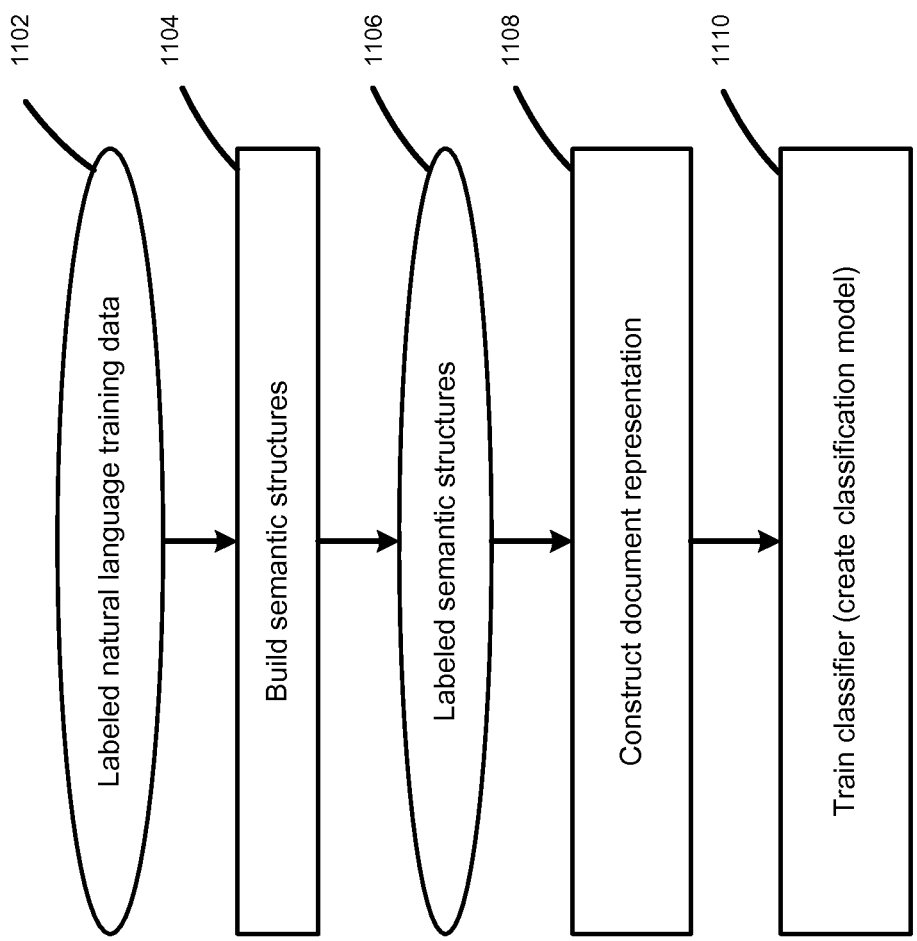
FIG. 11 is a flow diagram of another method according to one or more embodiments of the invention.

One implementation of the disclosed methods is a method of supervised learning such as the one shown in FIG. 11. Therefore, in this case, a training set with data for which the classes are already known is required. Supervised learning may be done as follows, with reference to FIG. 11. First, the training texts (labeled natural language training data) 1102 are analyzed (such as by a method shown in FIG. 12) and used to build language independent semantic structures 1104 reflecting semantic, morphological, syntactical and pragmatic information about source texts. Then, semantic structures are labeled 1106. Subsequently, an appropriate document representation is constructed. For this representation, a task similarity measure is chosen. A document representation is constructed 1108 and may be, for example, a vector-space model, and a similarity measure may be, for example, a cosine similarity. A classifier is built based on semantic structures 1110.

Figure 12:
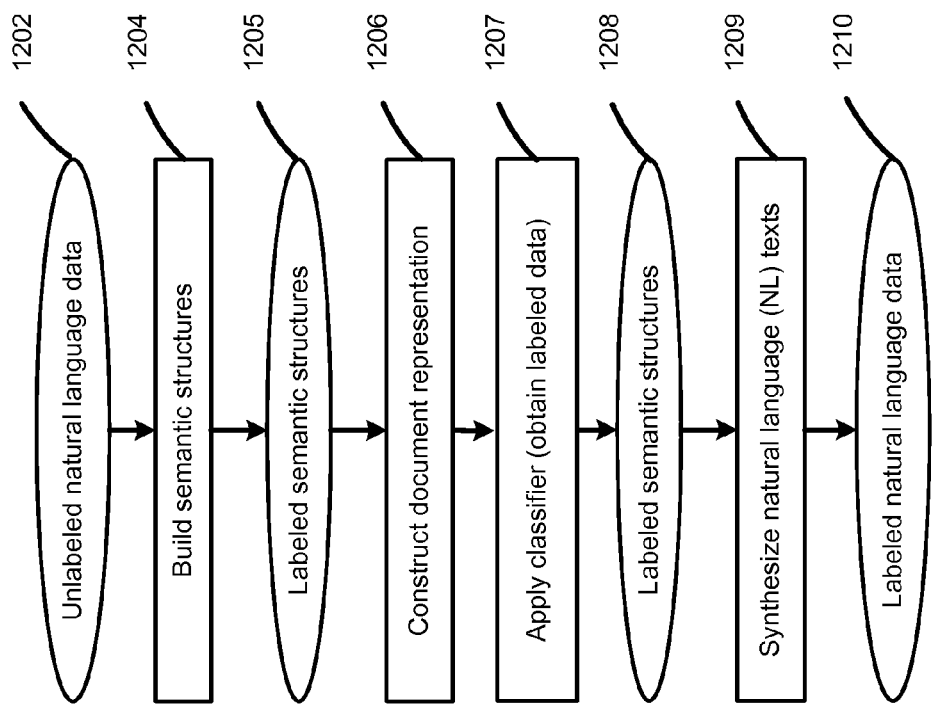
FIG. 12 is a flow diagram of another method according to one or more embodiments of the invention.

FIG. 12 is a flow diagram of another method or another portion of a method according to one or more embodiments of the invention. With reference to FIG. 12, test (unlabeled) natural language data is analyzed 1202, for example by building semantic structures 1204, labeling semantic structures 1205, and constructing document representations 1206. Then, one or more classifiers 1110 are applied to the test data 1207. One result of applying one or more classifiers is a set of classified (i.e., labeled) semantic structures 1208. Natural language (NL) texts may then be synthesized 1209 from these labeled semantic structures. Any language or languages may be chosen for creating synthesized texts. Results (e.g., labeled natural language data 1210) may be presented in any language or in multiple languages.

One classification problem is based on the concept of similarity. There are many ways to calculate similarity between two texts. One naive way to find out if two texts are similar is to count how many words they have in common. There are also more advanced versions of this approach such as techniques involving lemmatization, stemming, weighting, etc. For example, a vector space model (G. Salton, 1975) may be built, and vector similarity measures, such as e.g. cosine similarity, may be utilized. During the text processing described here, documents may be represented with language independent semantic classes that in their turn may be considered as lexical features. Therefore, the similarity measures as were mentioned above may be.

Such similarity measures have a drawback in that they do not actually capture the semantics. For example, the two sentences, "Bob has a spaniel" and "Richard owns a dog" are semantically similar but they do not share any words but an article. Therefore, a mere lexical text similarity measure will fail to find that these sentences are similar. To capture this type of similarity, knowledge-based semantic similarity measures may be used. They require a semantic hierarchy to be calculated. Similarity between two words usually depends on a shortest path between corresponding concepts in a corresponding semantic hierarchy. For example, "spaniel" in the semantic hierarchy corresponding to the first sentence above appears as a child node (hyponym) of "dog," therefore semantic similarity between the concepts will be high. Word-to-word similarity measures may be generalized to text-to-text similarities by combining values for similarities of each word pair. Semantic classes described here represent nodes of semantic hierarchy. Therefore, knowledge-based semantic similarity measures described above and their generalizations to text-to-text similarity measures may be utilized within document processing.

Figure 13:
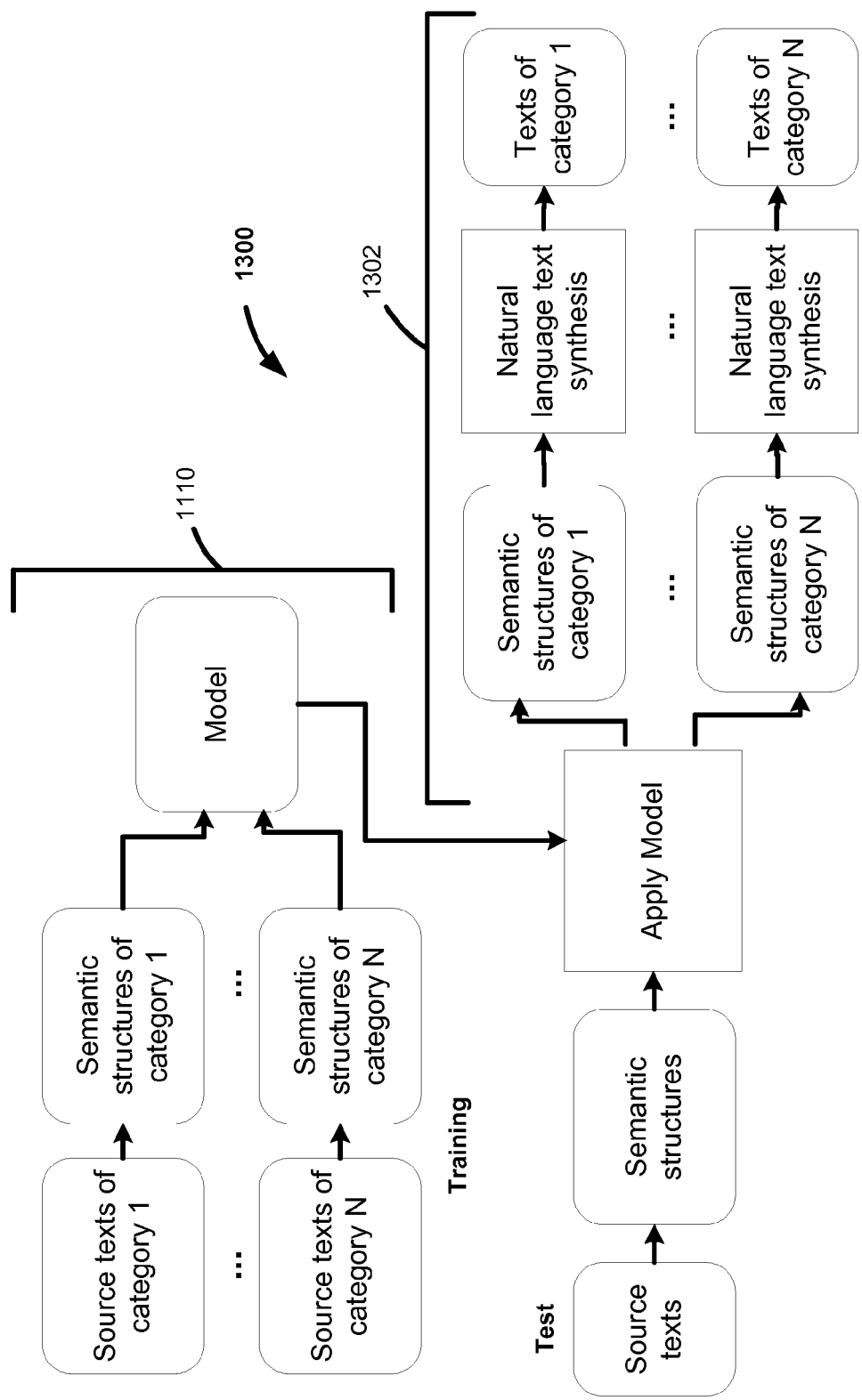
FIG. 13 is a process flow diagram illustrating categorization of texts according to one or more embodiments of the invention.

FIG. 13 is a process flow diagram 1300 illustrating categorization of texts according to one or more embodiments of the invention. Two or more source texts (such as source texts of various categories 1 . . . N) are used to build a classifier or classification model 1110. The model is applied 1302 to test texts, semantic structures, etc. The semantic structures of each respective test text (1 . . . M) can be classified by the model into one or more categories (1 . . . N). Application of the model may include placing or assigning a test text into one or more semantic structure categories. Next, a natural language synthesis can be performed, and texts belonging to categories (1 . . . N) are the result.

Figure 14:
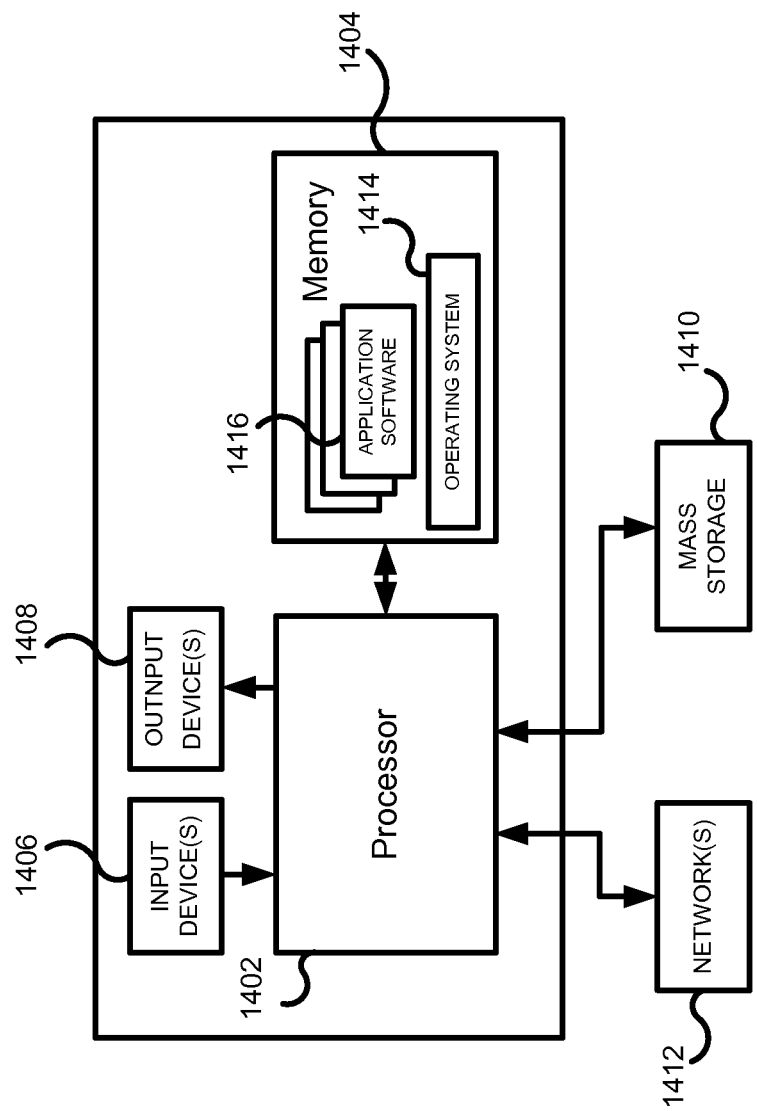
FIG. 14 shows an exemplary hardware for implementing computer system in accordance with one embodiment of the invention.

FIG. 14 shows exemplary hardware for implementing the techniques and systems described herein, in accordance with one implementation of the present disclosure. Referring to FIG. 14, the exemplary hardware 1400 includes at least one processor 1402 coupled to a memory 1404. The processor 1402 may represent one or more processors (e.g. microprocessors), and the memory 1404 may represent random access memory (RAM) devices comprising a main storage of the hardware 1400, as well as any supplemental levels of memory, e.g., cache memories, non-volatile or back-up memories (e.g. programmable or flash memories), read-only memories, etc. In addition, the memory 1404 may be considered to include memory storage physically located elsewhere in the hardware 1400, e.g. any cache memory in the processor 1402 as well as any storage capacity used as a virtual memory, e.g., as stored on a mass storage device 1410.

The hardware 1400 also typically receives a number of inputs and outputs for communicating information externally For interface with a user or operator, the hardware 1400 may include one or more user input devices 1406 (e.g., a keyboard, a mouse, imaging device, scanner, microphone) and a one or more output devices 1408 (e.g., a Liquid Crystal Display (LCD) panel, a sound playback device (speaker)). To embody the present invention, the hardware 1400 typically includes at least one screen device.

For additional storage, the hardware 1400 may also include one or more mass storage devices 1410, e.g., a floppy or other removable disk drive, a hard disk drive, a Direct Access Storage Device (DASD), an optical drive (e.g. a Compact Disk (CD) drive, a Digital Versatile Disk (DVD) drive) and/or a tape drive, among others. Furthermore, the hardware 1400 may include an interface with one or more networks 1412 (e.g., a local area network (LAN), a wide area network (WAN), a wireless network, and/or the Internet among others) to permit the communication of information with other computers coupled to the networks. It should be appreciated that the hardware 1400 typically includes suitable analog and/or digital interfaces between the processor 1402 and each of the components 1404, 1406, 1408, and 1412 as is well known in the art.

The hardware 1400 operates under the control of an operating system 1414, and executes various computer software applications, components, programs, objects, modules, etc. to implement the techniques described above. Moreover, various applications, components, programs, objects, etc., collectively indicated by application software 1416 in FIG. 14, may also execute on one or more processors in another computer coupled to the hardware 1400 via a network 1412, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as a "computer program." A computer program typically comprises one or more instruction sets at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally to actually effect the distribution regardless of the particular type of computer-readable media used. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modified or re-arranged in one or more of its details as facilitated by enabling technological advancements without departing from the principals of the present disclosure.

We claim:

1. A method of performing text classification based on language-independent text features, the method comprising:
    performing, by a processor, a first syntactic and semantic analysis of a training natural language text to produce a first plurality of language-independent semantic structures representing a plurality of sentences of the training natural language text;
    producing, based on the first plurality of language-independent semantic structures, a text classifier model;
    performing a second syntactic and semantic analysis of an input natural language text to produce a second plurality of language-independent semantic structures representing a plurality of sentences of the input natural language text;
    extracting, using the second plurality of language-independent semantic structures, a set of features, wherein at least one feature references a semantic class of a language-independent semantic hierarchy comprising a plurality of semantic classes, in which the semantic class exhibits one or more properties inherited from its parent semantic class;
    applying the text classifier model to the set of features to produce a classification spectrum comprising a plurality of weight values, wherein each weight value reflects a degree of association of the input natural language text with a particular category of natural language texts; and
    associating the input natural language text with one or more categories using the classification spectrum.

2. The method of claim 1, wherein the second syntactic and semantic analysis further includes determining a grammatical feature of the input natural language text.

3. The method of claim 1, wherein the second syntactic and semantic analysis further includes determining a lexical feature of the input natural language text.

4. The method of claim 1, wherein the second syntactic and semantic analysis further includes determining a syntactic feature of the input natural language text.

5. The method of claim 1, wherein the second syntactic and semantic analysis further includes determining a semantic feature of the input natural language text.

6. The method of claim 1, wherein the second syntactic and semantic analysis further includes generating a syntactic structure of a sentence of the input natural language text.

7. The method of claim 1, wherein the categories are represented by language independent categories.

8. A non-transitory computer readable storage medium comprising executable instructions for causing a computing system to perform operations comprising:
    performing a first syntactic and semantic analysis of a training natural language text to produce a first plurality of language-independent semantic structures representing a plurality of sentences of the training natural language text; producing, based on the first plurality of language-independent semantic structures, a text classifier model;
    performing a second syntactic and semantic analysis of an input natural language text to produce a second plurality of language-independent semantic structures representing a plurality of sentences of the input natural language text;

extracting, using the second plurality of language-independent semantic structures, a set of features, wherein at least one feature references a semantic class of a language-independent semantic hierarchy comprising a plurality of semantic classes, in which the semantic class exhibits one or more properties inherited from its parent semantic class;

applying the text classifier model to the set of features to produce a classification spectrum comprising a plurality of weight values, wherein each weight value references a degree of association of the input natural language text with a particular category of natural language texts; and associating the input natural language text with one or more categories using the classification spectrum.

9. The non-transitory computer readable storage medium of claim 8, wherein the second syntactic and semantic analysis further includes determining a grammatical feature of the input natural language text.

10. The non-transitory computer readable medium of claim 8, wherein the second syntactic and semantic analysis further includes determining a lexical feature of the input natural language text.

11. The non-transitory computer readable medium of claim 8, wherein the second syntactic and semantic analysis further includes determining a syntactic feature of the input natural language text.

12. The non-transitory computer readable medium of claim 8, wherein the second syntactic and semantic analysis further includes determining a semantic feature of the input natural language text.

13. The non-transitory computer readable medium of claim 8, wherein the second syntactic and semantic analysis further includes generating a syntactic structure of a sentence of the input natural language text.

14. The non-transitory computer readable medium of claim 8, wherein the categories are represented by language independent categories.

15. A computer system adapted to perform text classification based on language-independent text features, the computer system comprising:

a feature extractor adapted to perform operations comprising:
performing a first syntactic and semantic analysis of a training natural language text to produce a first plurality of language-independent semantic structures representing a plurality of sentences of the training natural language text;
producing, based on the first plurality of language-independent semantic structures, a text classifier model;
performing a second syntactic and semantic analysis of an input natural language text to produce a second plurality of language-independent semantic structures representing a plurality of sentences of the input natural language text;
extracting, using the second plurality of language-independent semantic structures, a set of features, wherein at least one feature references a semantic class of a language-independent semantic hierarchy comprising a plurality of semantic classes, in which the semantic class exhibits one or more properties inherited from its parent semantic class; and a text classifier adapted to perform operations comprising:
applying the text classifier model to the set of features to generate a classification spectrum comprising a plurality of weight values, wherein each weight value references a degree of association of the input natural language text with a particular category of natural language texts; and
associating the input natural language text with one or more categories using the classification spectrum.

16. The computer system of claim 15, wherein the feature extractor is further adapted to perform operations comprising:
determining a grammatical feature of the input natural language text.

17. The computer system of claim 15, wherein the feature extractor is further adapted to perform operations comprising:
determining a lexical feature of the input natural language text.

18. The computer system of claim 15, wherein the feature extractor is further adapted to perform operations comprising:
determining a syntactic feature of the input natural language text.

19. The computer system of claim 15, wherein the feature extractor is further adapted to perform operations comprising:
determining a semantic feature of the input natural language text.

20. The computer system of claim 15, wherein the feature extractor is further adapted to perform operations comprising:
generating a syntactic structure of a sentence of the input natural language text.

21. The computer system of claim 15, wherein the categories are represented by language independent categories.

* * * * *